(12) United States Patent
Zaitsu

(10) Patent No.: US 8,027,113 B2
(45) Date of Patent: Sep. 27, 2011

(54) MAGNETIC READ/WRITE DEVICE PREVENTING MALFUNCTION DUE TO REVERSAL IN POLARITY

(75) Inventor: Hideki Zaitsu, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 325 days.

(21) Appl. No.: 11/285,904

(22) Filed: Nov. 22, 2005

(65) Prior Publication Data
US 2006/0132951 A1    Jun. 22, 2006

(30) Foreign Application Priority Data
Dec. 20, 2004   (JP) ................................ 2004-367370

(51) Int. Cl.
*G11B 5/09*  (2006.01)
*G11B 5/596* (2006.01)
(52) U.S. Cl. ...................................... 360/46; 360/77.08
(58) Field of Classification Search .................. None
See application file for complete search history.

(56) References Cited

U.S. PATENT DOCUMENTS

| 5,371,724 | A  | * | 12/1994 | Uno .......................... 360/78.14 |
| 6,369,969 | B1 | * | 4/2002  | Christiansen et al. .......... 360/66 |
| 7,061,704 | B2 | * | 6/2006  | Dunn ............................ 360/39 |
| 7,307,807 | B1 | * | 12/2007 | Han et al. ........................ 360/75 |

FOREIGN PATENT DOCUMENTS

| JP | 2000-251203 | 9/2000 |
| JP | 2001-006133 | 1/2001 |
| JP | 2003-085704 | 3/2003 |

* cited by examiner

*Primary Examiner* — Daniell L Negron

(57) ABSTRACT

Embodiments of the invention provide a magnetic read/write device capable of reading/writing data even when a reversal of the output polarity of the readback signal occurs. In one embodiment, a magnetic read/write device is provided which constantly checks the output polarity based on the polarity of the waveform of a signal obtained as a result of equalizing the waveform of a readback signal of gray code (indicating a cylinder number) in each servo sector by use of a matched filter (MF), or based on the waveform of a readback signal read from areas of a magnetic disk which store a special pattern for detecting the output polarity. When a polarity reversal has occurred, the magnetic read/write device assumes that a read error has occurred and performs processing so as not to perform any track seek or track following operation using decoded positional information. The magnetic read/write device then reverses the polarity of the output signal by use of a polarity reversing unit provided within or on the input side of a read/write channel, and resumes servo and read/write operations.

18 Claims, 11 Drawing Sheets

MAGNETIC READ/WRITE DEVICE PREVENTING MALFUNCTION DUE TO REVERSAL IN POLARITY

CROSS-REFERENCES TO RELATED APPLICATIONS

This application claims priority from Japanese Patent Application No. JP2004-367370, filed Dec. 20, 2004, the entire disclosure of which is incorporated herein by reference.

BACKGROUND OF THE INVENTION

The present invention relates to a magnetic read/write device which writes data to a recording medium as magnetic information by use of a write head and then reads and decodes the written magnetic information by use of a read head. More particularly, the present invention relates to a technique of preventing malfunction due to a reversal in the polarity of the read output from the read head.

One method for increasing the recording density of a magnetic read/write device is to use a GMR (Giant Magnetoresistive) head, which has become very common. A GMR head includes a free layer whose magnetization direction can be changed by an external magnetic field. Since the resistance of the GMR element changes with the magnetization direction of the free layer, written information (on the disk) can be read by converting this change in the resistance into voltages.

Even though the polarity of this (voltage) output usually does not change, a polarity reversal may possibly occur while the head is operating, depending on the configuration of the head. If this happens, the waveform of the read signal will become inverted. Conventional GMR heads are designed such that no output polarity reversal occurs. However, as the device size and the distance between the read shields have been reduced, it has become difficult to ensure sufficient resistance to polarity reversal. To provide a reduced head device size, the "automatic pinning type" GMR head has been studied and developed in which an antiferromagnetic layer is not disposed adjacent the pinned layer. The "automatic pinning type" GMR head has very good read performance but is disadvantageous in that the magnetization direction of the pinned layer tends to be readily reversed due to contact with the medium, etc.

If a reversal in the polarity of the read output has occurred, the magnetic read/write device may become unable to decode read positional information, or may incorrectly decode it, which prevents the magnetic read/write device from positioning the head. Under the worst case conditions, the magnetic read/write device might run out of control and break down. Even if such a runaway does not occur, the magnetic read/write device will become unable to position the head, leading to an inability to decode user data.

To accommodate reversal of the output polarity due to degradation of the read head, Patent Document 1 (Japanese Patent Laid-Open No. 2000-251203) discloses a method which includes the steps of: when a read data error has occurred, reading a reference signal (or an address mark) from the servo data and determining the polarity of the output; and upon detecting a polarity reversal, supplying a refresh current to the read head to return the output polarity to normal.

In the case of the "pre-servo write" system, to accommodate reversal of the output polarity due to the difference between each head in the magnetic read/write device and each head (in the servo writer) used to perform servo write operation to the device, Patent Document 2 (Japanese Patent Laid-Open No. 2003-85704) discloses a method which stores the output polarity of each head and thereby allows the magnetic read/write device to read servo information even when there is a polarity difference between these heads by utilizing the polarity switching function of the read channel.

BRIEF SUMMARY OF THE INVENTION

The above conventional techniques check the current output polarity upon detection of a read data error or a servo error and (if there is a polarity reversal) perform processing for restoring the normal output polarity before returning to a normal read/write operation. Therefore, if the device incorrectly decodes servo information due to a reversal in the output polarity, the servo system might run away. Furthermore, since detecting and correcting the output polarity takes time, the data transfer speed of the device might be significantly reduced if a polarity reversal frequently occurs. It should be noted that even with reversed output polarity, the magnetic read/write device can decode user data without an increase in the error rate if the positioning is properly carried out. Therefore, if the magnetic read/write device can obtain proper positional information even when a reversal of the output polarity occurs, the device can maintain its original read/write function.

A feature of the present invention is to provide a magnetic read/write device capable of reading/writing data even when a polarity reversal of the output readback signal occurs.

A magnetic read/write device according to an aspect of the present invention comprises: a magnetic recording medium with a plurality of tracks each having servo sectors and data sectors thereon, the data sectors being disposed between the servo sectors; a magnetic head for reading information written in the tracks of the magnetic recording medium; and a signal processing circuit for receiving a read output from the magnetic head and, upon detecting a reversal in the polarity of a readback signal based on positional information in each servo sector, performing read error processing.

The signal processing circuit may detect the polarity of the readback signal on a servo sector basis. The positional information may be gray code. Alternatively, the positional information may be a cylinder number. Further alternatively, the positional information may be a sector number.

The read error processing may include: interrupting positional control of the magnetic head, the positional control being performed based on the read positional information; reversing the polarity of the readback signal; and resuming the positional control of the magnetic head.

A magnetic read/write device according to another aspect of the present invention comprises: a magnetic recording medium with a plurality of tracks each having servo sectors and data sectors thereon, the data sectors being disposed between the servo sectors; a magnetic head for reading information written in the tracks of the magnetic recording medium; a signal processing circuit for receiving a read output from the magnetic head and, upon detecting a reversal in the polarity of a readback signal based on positional information in each servo sector, performing read error processing; and a polarity reversing unit for, when the signal processing circuit has detected a reversal in the polarity of the readback signal, reversing the polarity of the readback signal.

The polarity reversing circuit may be provided on the input side of the signal processing circuit.

A magnetic read/write device according to another aspect of the present invention comprises: a magnetic recording medium with a plurality of tracks, a portion of each track having written thereon a pattern for detecting the polarity of each (servo data) readback signal; a magnetic head for reading information written in the tracks of the magnetic recording medium; and a signal processing circuit for receiving a read output from the magnetic head and, upon detecting a reversal in the polarity of a (servo data) readback signal based on a readback signal of the pattern for detecting the polarity of each (servo data) readback signal, performing read error processing.

The pattern for detecting the polarity of each (servo data) readback signal has a single-polarity single-peaked waveform.

The present invention can provide a magnetic read/write device capable of reading/writing data even when a reversal of the polarity of the output readback signal occurs. Further, the magnetic read/write device can detect and correct reversal of the output polarity on a servo sector basis. This means that even if a reversal of the output polarity has occurred on a servo sector, the magnetic read/write device can still decode the readback signals from the subsequent servo sectors, which allows the device to have increased reliability and prevent reduction of its data transfer speed.

BRIEF DESCRIPTION OF THE DRAWINGS

FIG. 11 is a diagram showing the device configuration of an "automatic pinning type" GMR head.

DETAILED DESCRIPTION OF THE INVENTION

Figure 2:
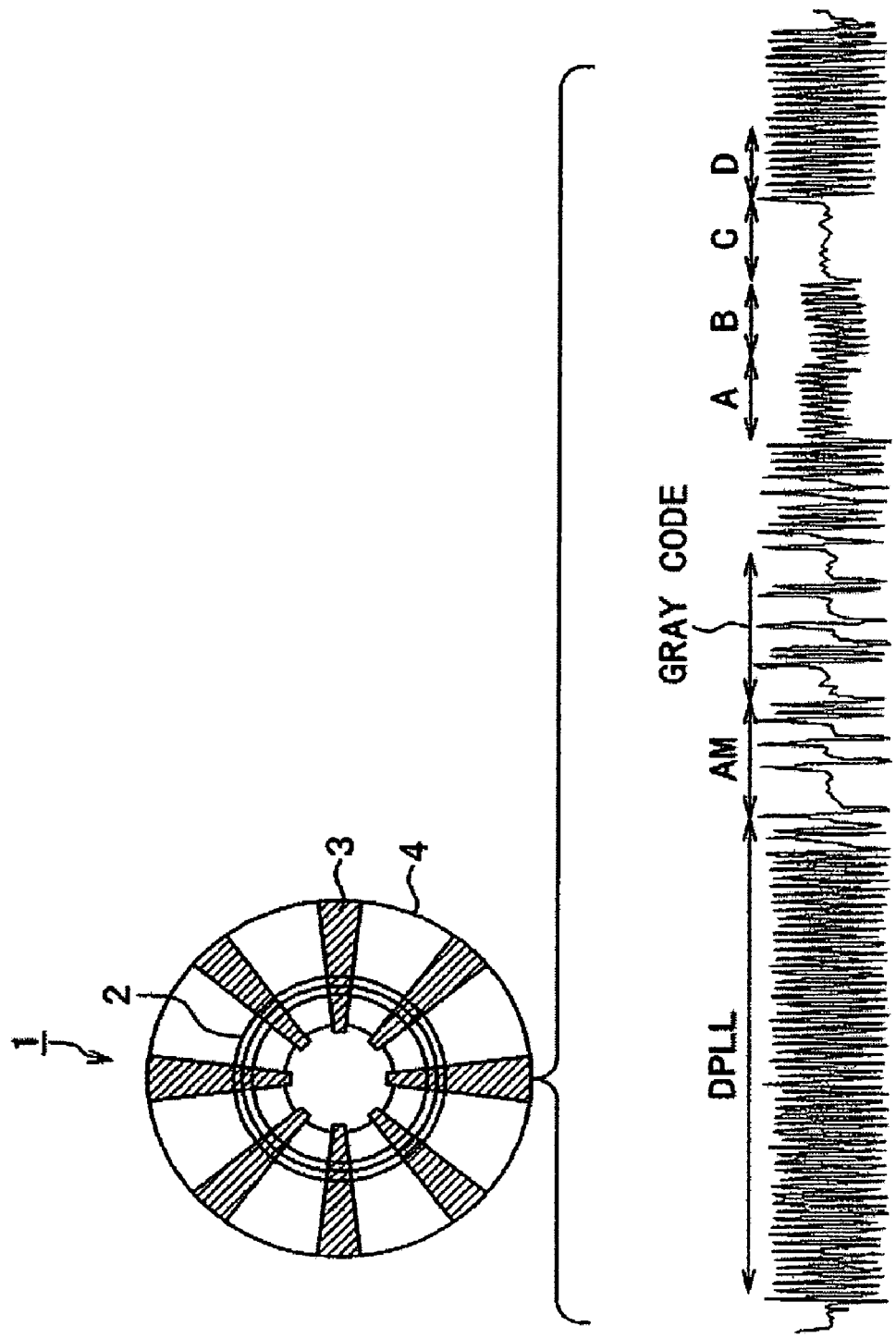
FIG. 2 is a diagram showing the arrangement of servo sectors on a magnetic disk and the waveform of a signal read from a servo sector.

The present invention will be described as applied to a sector servo magnetic disk drive, which is an exemplary magnetic read/write device. FIG. 2 shows the arrangement of servo sectors 3 and data sectors 4 on tracks 2 of a recording medium (or a magnetic disk) 1 and the waveform of a signal read from a servo sector 3. Thus, a plurality of servo sectors 3 with positional information written thereon are disposed on the magnetic disk 1, and a plurality of data sectors 4 to which user data is written are disposed between the servo sectors 3. In a read/write operation, the magnetic disk drive decodes information in servo sectors 3, performs tracking of the magnetic head based on the decoded information, and performs a read/write operation on a desired data sector 4. The information stored in each sector 3 primarily includes: a burst pattern (DPLL) used for pull-in operation on the phase of the readback signal; an address mark (AM) indicating the beginning of the positional information; a gray code indicating a cylinder or track number and a sector number; and burst patterns (A to D) used to generate a position error signal (PES).

Figure 3:
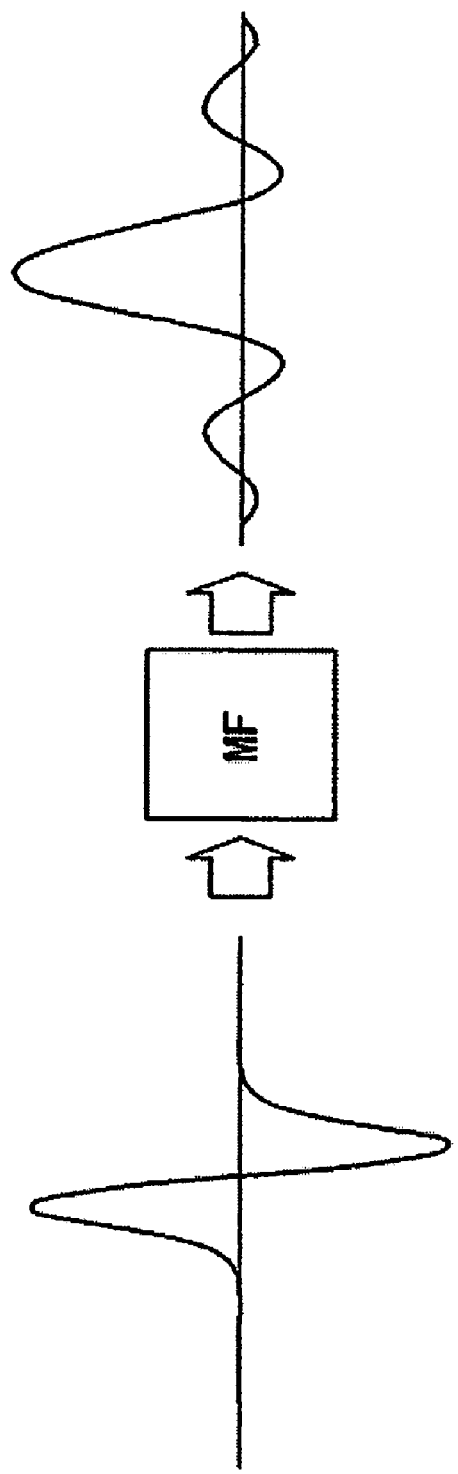
FIG. 3 is a diagram showing the waveform of a normal gray code readback signal.
Figure 4:
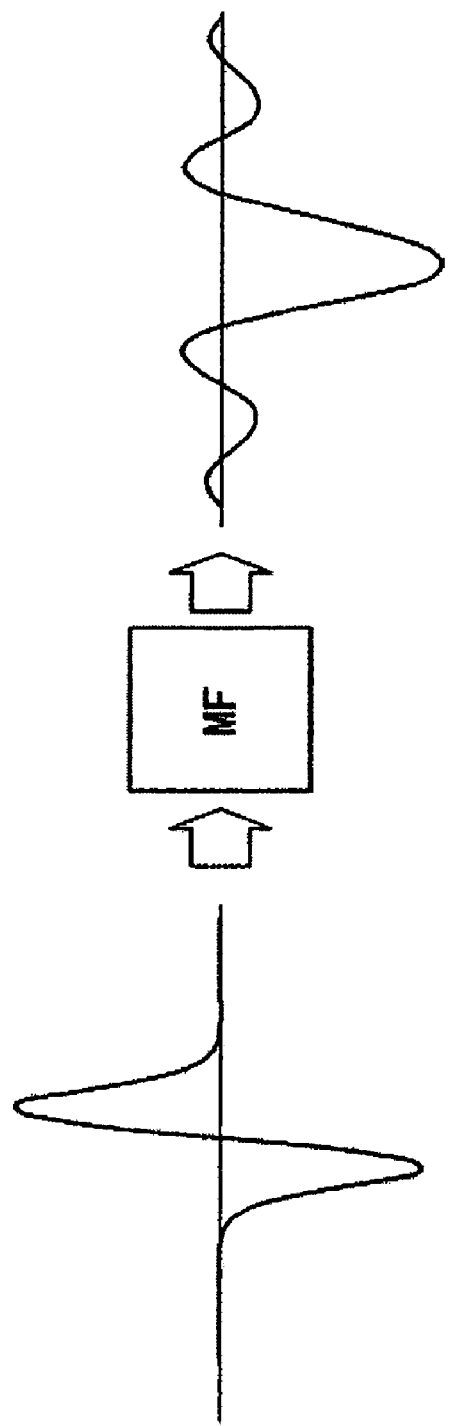
FIG. 4 is a diagram showing the waveform of a gray code readback signal whose output polarity has been reversed.

The gray code is made up of die pulses; a die pulse represents "0" (or "1") while an absence of a die pulse represents "1" (or "0"). When the gray code is decoded, the waveform of a signal read from the servo sector 3 is passed through the matched filter (MF) in the read/write channel (a signal processing circuit) to shape the waveform of each die pulse into a single-polarity single-peaked waveform, as shown in FIG. 3. Each peak represents "0" (or "1") while an absence of a peak represents "1" (or "0"). All peaks in the gray code have the same polarity. As shown in FIG. 4, reversal of the output polarity results in inversion of the shape of the die pulses. Therefore, the waveform of the signal equalized by the matched filter only includes peaks having the opposite polarity, as compared to the normal equalized signal (with no inversion). This means that the output polarity can be detected by detecting the polarity of the peaks of the signal equalized by the matched filter.

Reversal of the output polarity may occur since the resistance of GMR heads to such a reversal has been reduced by the reduction in the device size and the reduction in the distance between the read shields. Especially, "automatic pinning type" GMR heads tend to suffer reversal of the output polarity. FIG. 11 shows the device configuration of an "automatic pinning type" GMR head. As shown in the figure, a pinned layer made up of two ferromagnetic films P1 and P2 is disposed adjacent a free layer F. To increase the resistance of the pinned layer to an external magnetic field, the magnetic moments of the ferromagnetic films P1 and P2 are set to substantially the same magnitude, and furthermore an antiferromagnetic film of Ru, etc. is inserted between these films, so that the magnetic moments of the ferromagnetic films P1 and P2 are rigidly coupled together antiparallel. However, since the ferromagnetic film P2 provides only a low coercive force, the pinned layer does not have sufficient resistance to an external field and mechanical shock. Therefore, the present invention is effective when applied to "automatic pinning type" GMR heads, which do not include an antiferromagnetic layer having a function to pin the magnetism of the pinned layer and hence in which the pinned layer is disposed adjacent the lower gap.

Figure 5:
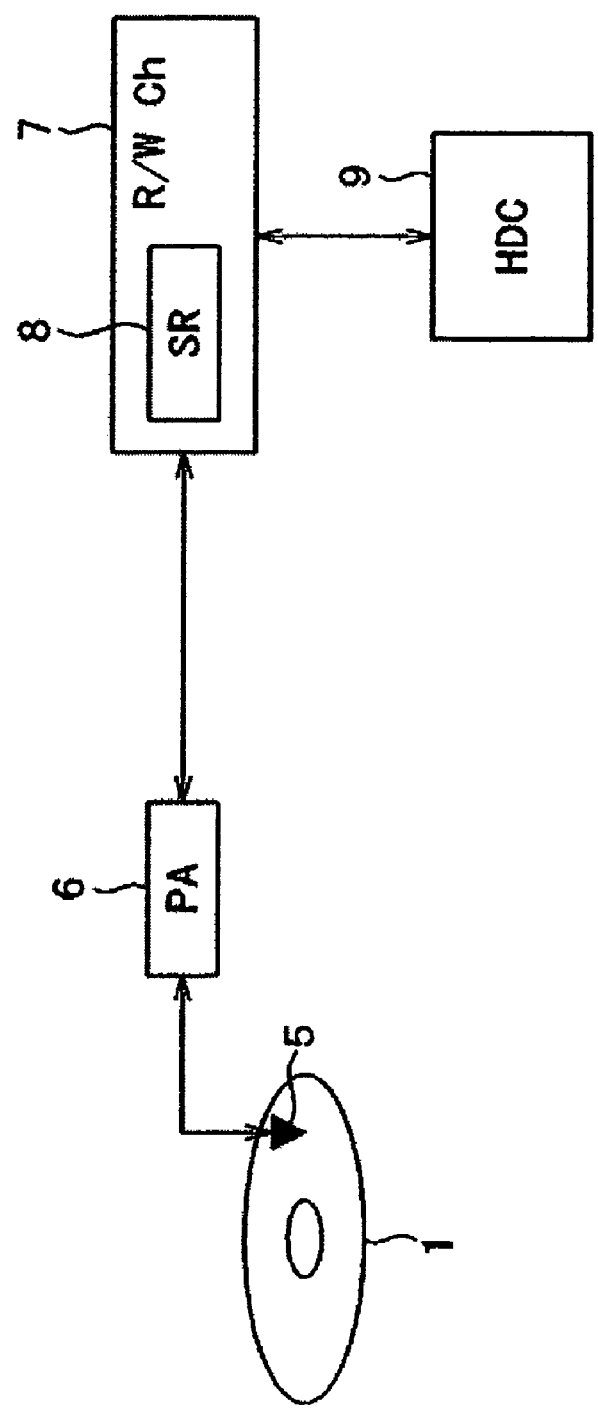
FIG. 5 is a block diagram showing the configuration of a first embodiment of the present invention.

FIG. 5 is a block diagram showing a first embodiment of the present invention. The signal read from a magnetic disk 1 by a magnetic head 5 is amplified by a preamplifier (PA) 6 and input to a read/write channel (R/W Ch) 7. Upon receiving positional information (made up of gray code written in a servo sector 3, as shown in FIG. 2) indicating a cylinder or track number and a sector number, the read/write channel 7 detects the polarity of the signal. The read/write channel 7 then decodes the input signal directly or after reversing its polarity by use of a polarity reversing unit (SR) 8, depending on the detected polarity. The signal decoded by the read/write channel 7 is output to a hard disk controller (NHDC) 9, which performs error correction on the signal before outputting it to the host device.

Figure 6:
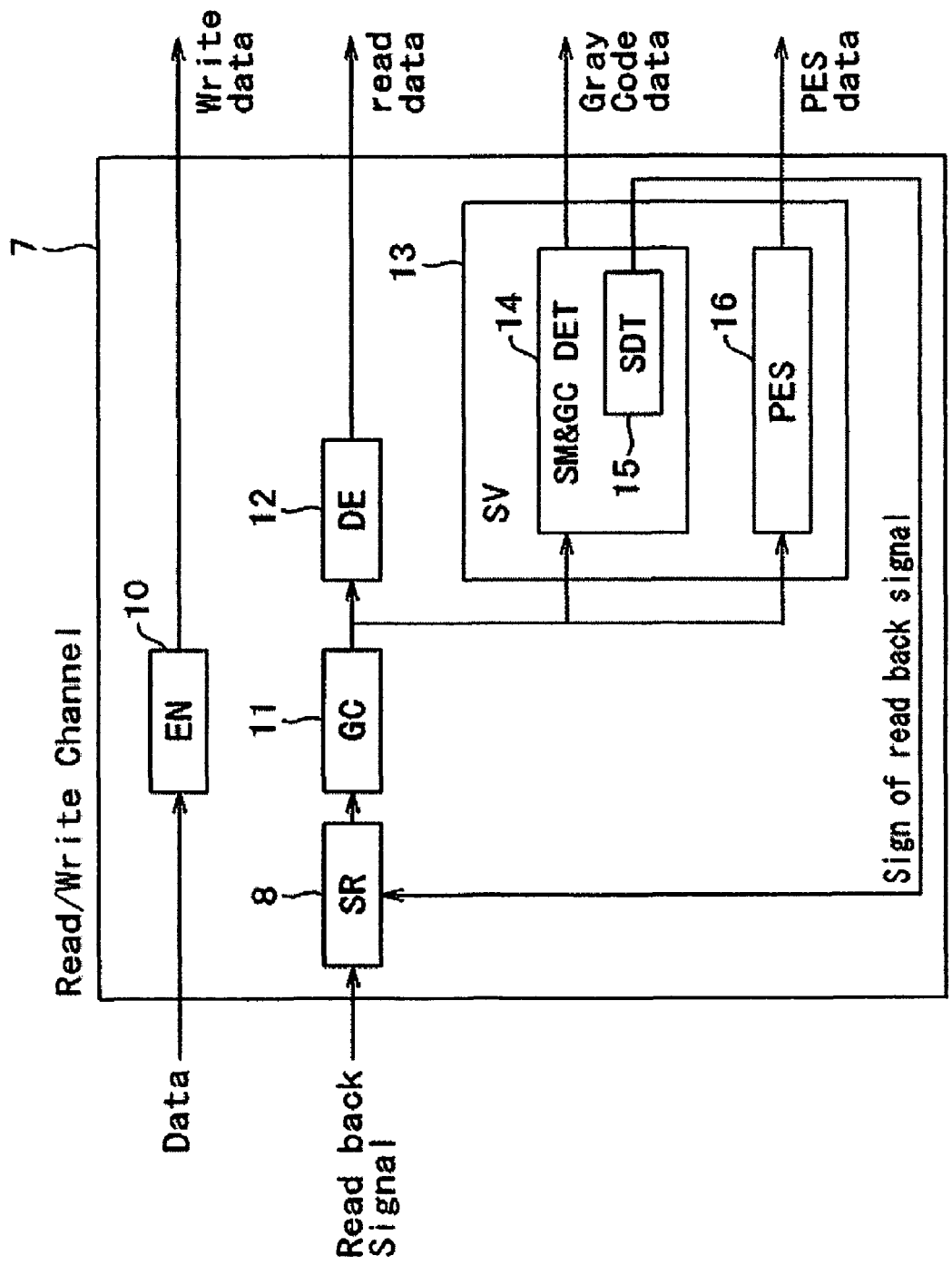
FIG. 6 is a block diagram showing the configuration of a read/write channel.

FIG. 6 is a block diagram showing the configuration of the read/write channel 7. The read/write channel 7 comprises: the polarity reversing unit (SR) 8 which receives a readback signal from the magnetic head 5; a gain control circuit (GC) 11 for adjusting the gain of the readback signal; a data decoder (DE) 12 for decoding the readback signal into user data; a servo signal decoder (SV) 13 for decoding the readback signal to generate positional information; and a data encoder (EN) 10 for receiving write data from the host device and encoding it. The servo signal decoder 13 includes: a synchronization signal/gray code detector (SM&GC DET)

14 which includes a polarity detector (SDT) 15 for detecting the polarity of the positional information signal (a cylinder number) and outputting the polarity data to the polarity reversing unit 8; and a position error signal generator (PES) 16 for generating a magnetic head position error signal from received burst patterns (A to D).

Figure 7:
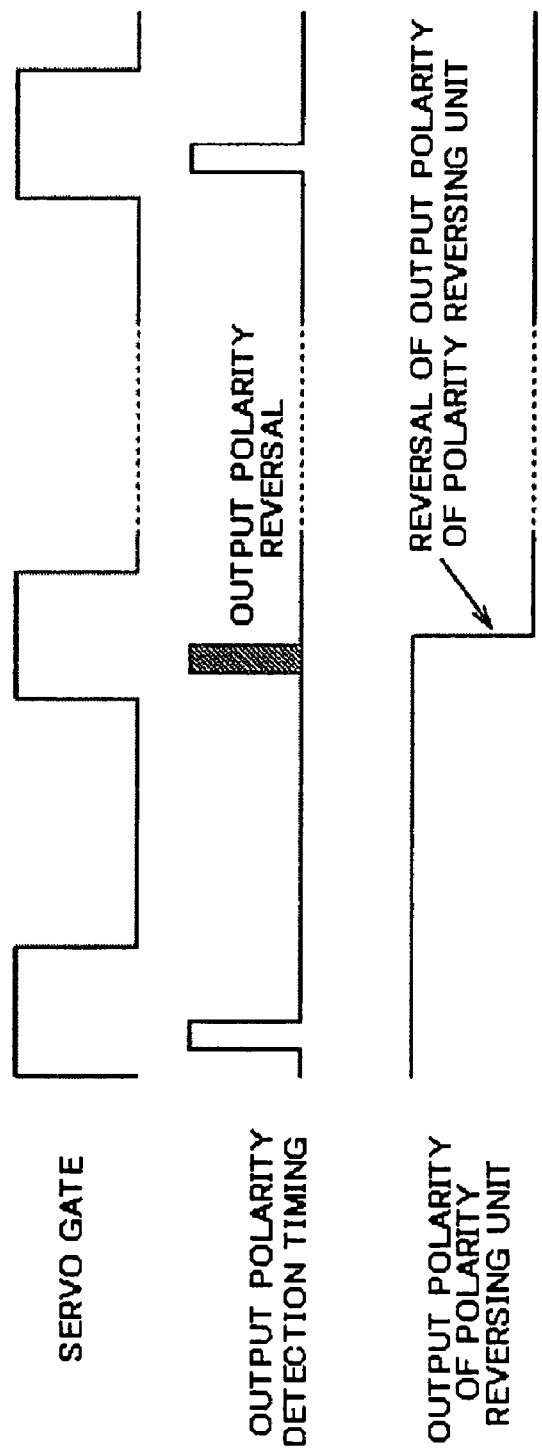
FIG. 7 is a diagram showing the operational timing of a magnetic disk drive of the first embodiment.

FIG. 7 is a timing chart illustrating an output polarity detection timing and the operational timing of the polarity reversing unit 8. The output polarity is detected on a servo sector basis. Upon detection of a reversal in the polarity, the polarity reversing circuit 8 reverses the polarity of the readback signal.

Figure 1:
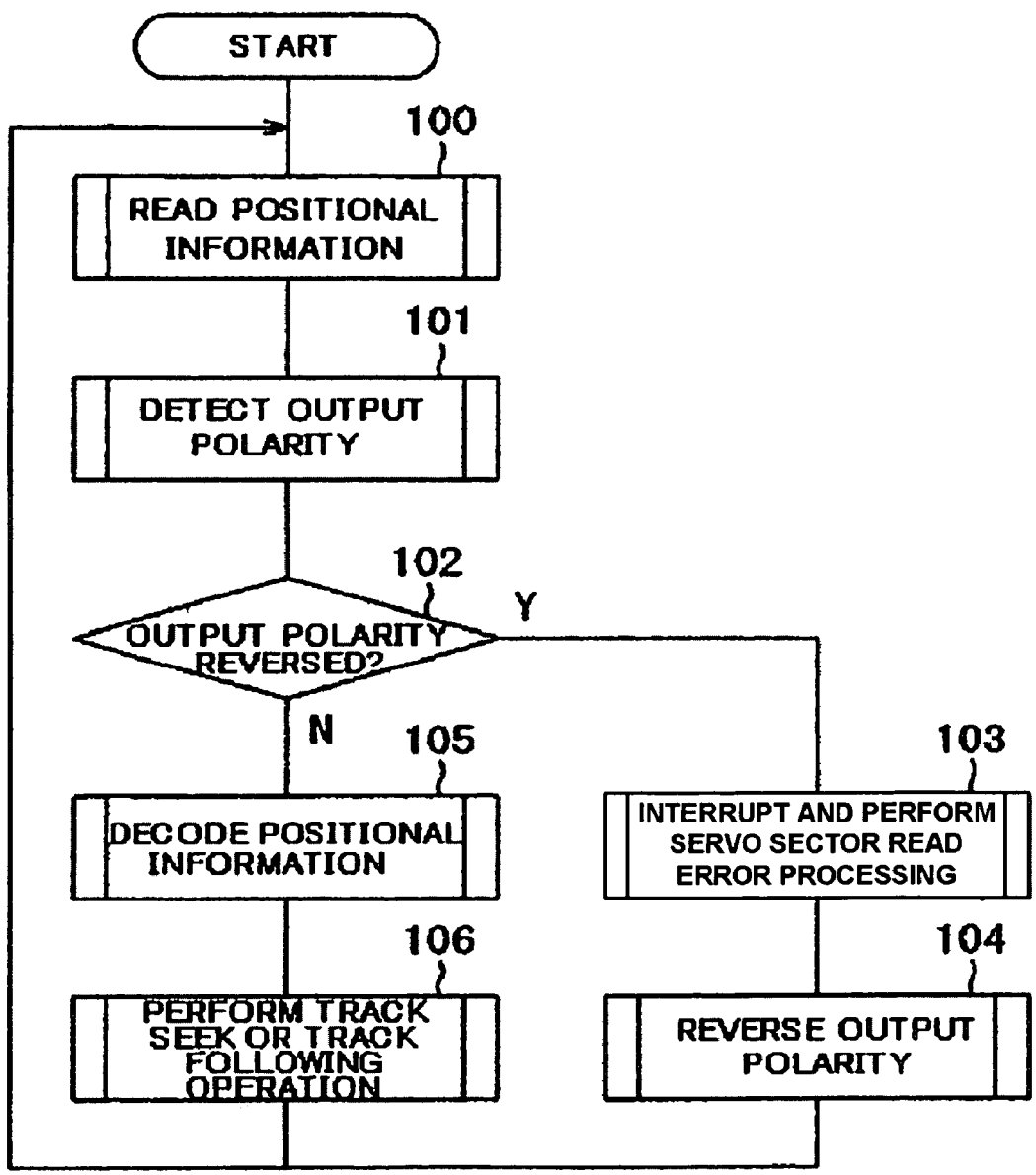
FIG. 1 is a flowchart illustrating the operation of a magnetic disk drive according to an embodiment of the present invention.

The above operation of the present embodiment will be described with reference to the flowchart shown in FIG. 1. The synchronization signal/gray code detector 14 reads positional information from a servo sector at step 100, and the polarity detector 15 detects the output polarity at step 101 and determines at step 102 whether a reversal of the output polarity has occurred. If so, the magnetic disk drive assumes that a servo sector read error has occurred even if it can decode the position signal, and performs servo sector read error processing at step 103 so as interrupt and not perform any track seek or track following operation using decoded positional information. Then, after the polarity reversing unit reverses the output polarity at step 104, the magnetic disk drive returns to a normal track seek or track following operation. If, on the other hand, it is determined at step 102 that the output polarity is normal, the magnetic disk drive decodes the positional information directly at step 105 and performs a track seek or track following operation at step 106. It should be noted that even though the present embodiment detects the output polarity by use of the polarity detector 15, this may be done when the positional information is decoded.

To position its magnetic head, a magnetic disk drive generally reads and decodes the positional information (a cylinder number) stored in each servo sector to determine the current head position and performs a track seek or track following operation to a target cylinder based on the decoded positional information. Traditionally, even when a reversal of the output polarity occurs, the magnetic disk drive attempts to position the magnetic head until it detects a servo error. Therefore, if the positional information is incorrectly decoded due to the reversal of the output polarity, the magnetic head may run out of control and collide with the stopper. According to the above embodiment of the present invention, however, upon detecting an output polarity reversal, the magnetic disk drive assumes that a read error has occurred on the positional information in the current servo sector, which makes it possible to prevent the servo from running out of control due to incorrect decoding of the positional information. Furthermore, the magnetic disk drive detects and corrects reversal of the output polarity on a servo sector basis. This means that even if a reversal of the output polarity has occurred on a servo sector, the magnetic disk drive can still decode the readback signals from the subsequent servo sectors.

Figure 8:
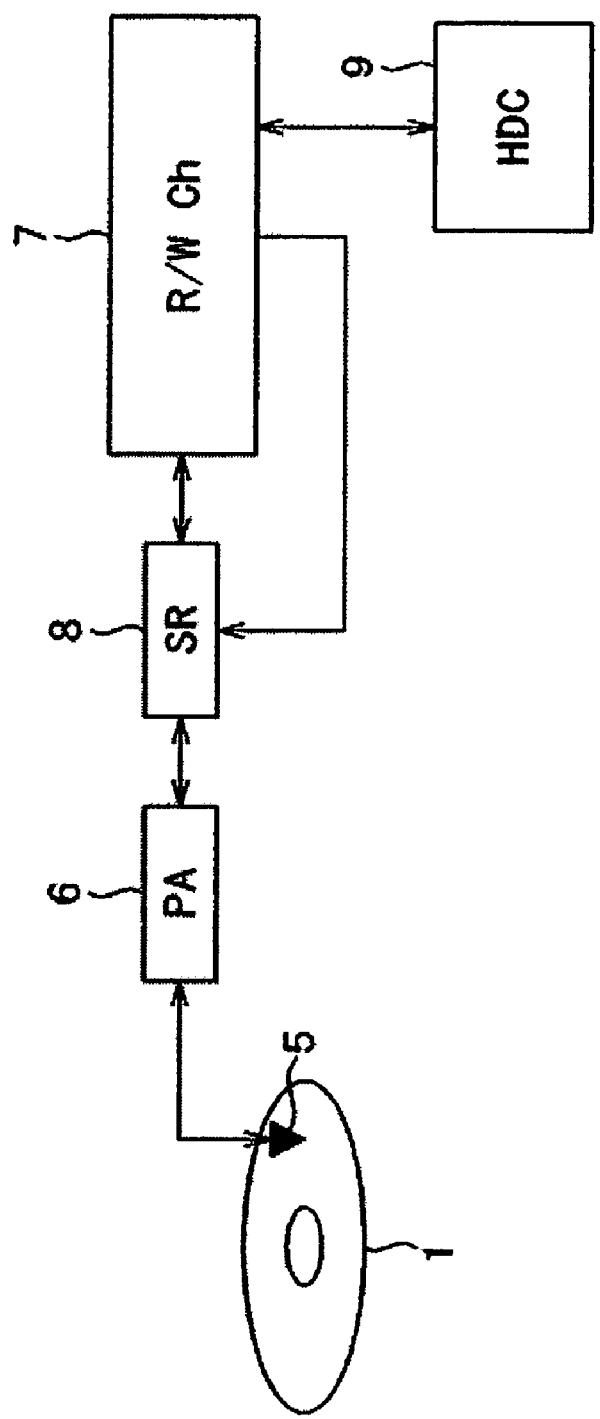
FIG. 8 is a block diagram showing the configuration of a variation of the first embodiment.

According to the present embodiment, the polarity switching function of the read/write channel 7 corresponds to the polarity reversing unit 8. However, the polarity reversing unit 8 may be separately provided on the input side of the read/write channel 7, as shown in FIG. 8, and upon detection of a reversal of the output polarity, the read/write channel 7 may notify the polarity reversing unit 8 of the detection through the feedback loop. Further, the reversal of the output polarity may cause a change in the waveform of the readback signal. In such a case, the parameters of the read/write channel may be newly optimized.

Figure 9:
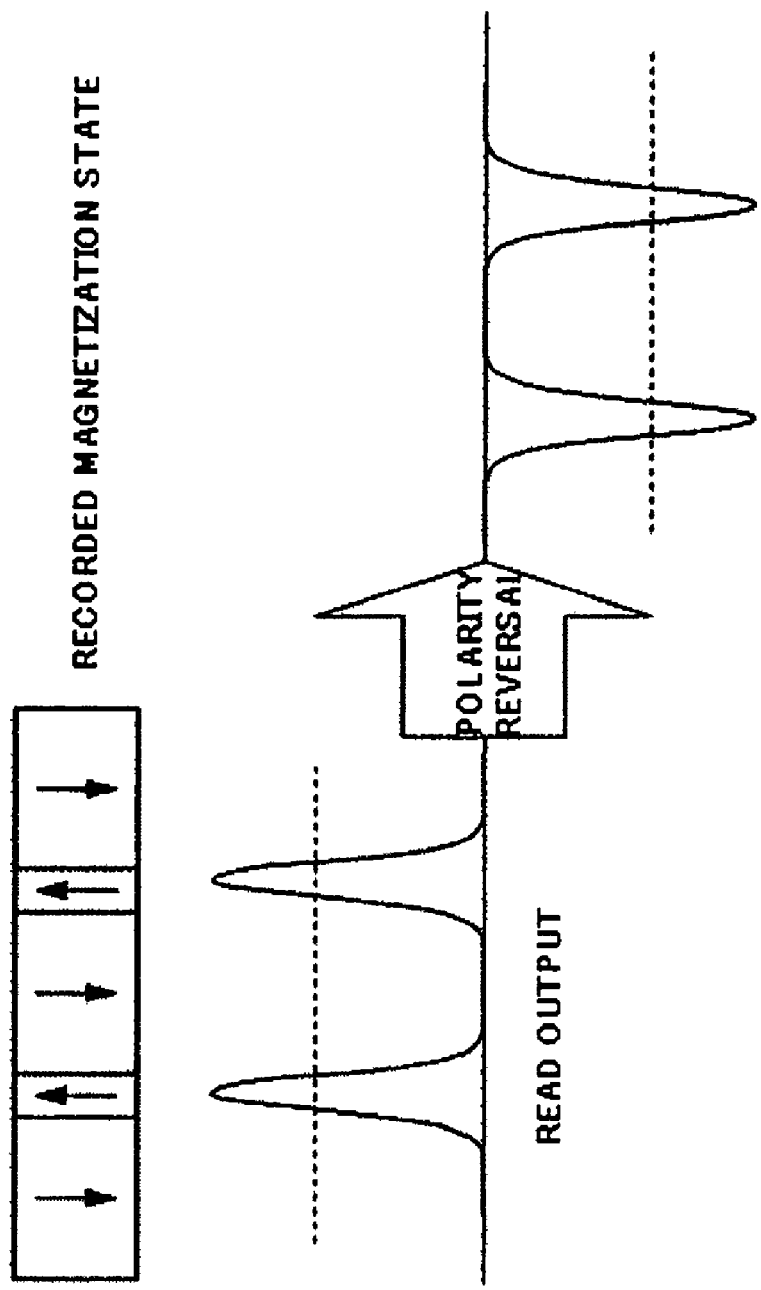
FIG. 9 is a diagram used to describe a second embodiment of the present invention.

A second embodiment of the present invention will be described below with reference to FIGS. 9 and 10. According to the present embodiment, a special pattern for detecting the output polarity is written on the surface of the recording medium beforehand, and detection of the output polarity is achieved by reading this pattern. FIG. 9 shows an exemplary written pattern (a recorded magnetization pattern) for detecting the output polarity in perpendicular magnetic recording. As shown in the figure, this pattern consists of two types of components: those having a shorter bit length; and those having a longer bit length. They are magnetized in opposite directions and alternately formed. This arrangement allows the magnetic head to produce a readback signal waveform including only pulses having the same polarity. Since reversal of the output polarity results in inversion of these pulses, the output polarity can be detected by checking the polarity of these pulses.

Figure 10:
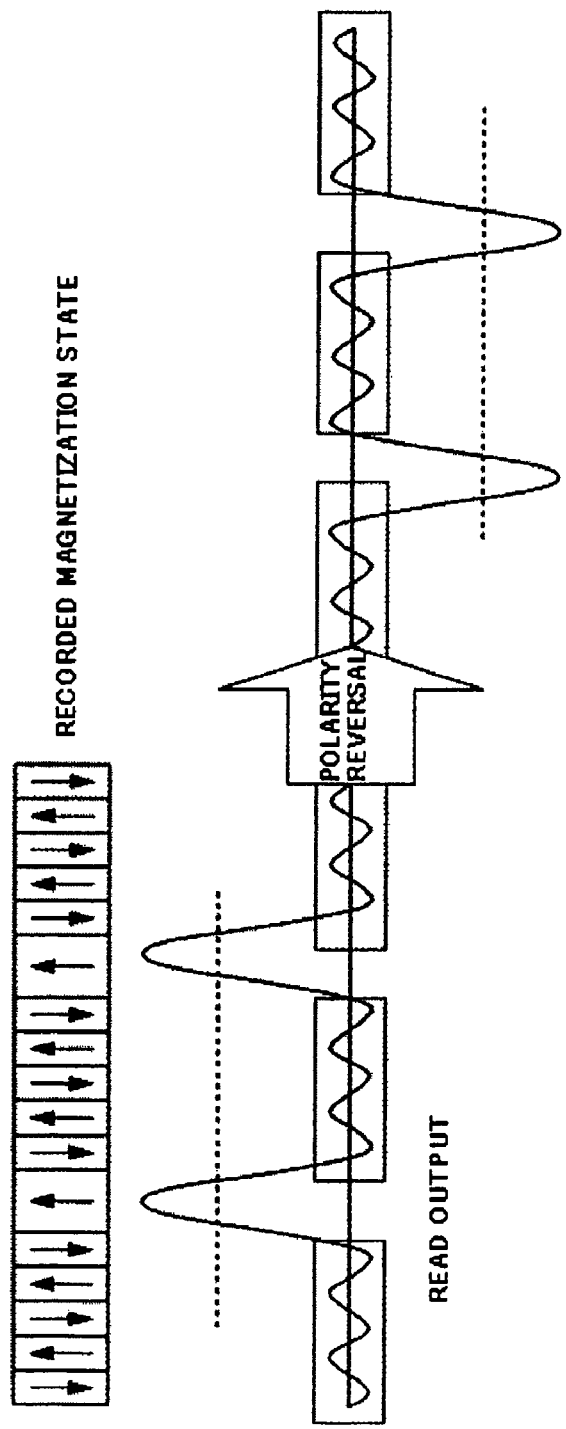
FIG. 10 is a diagram used to describe a variation of the second embodiment.
Figure 1:
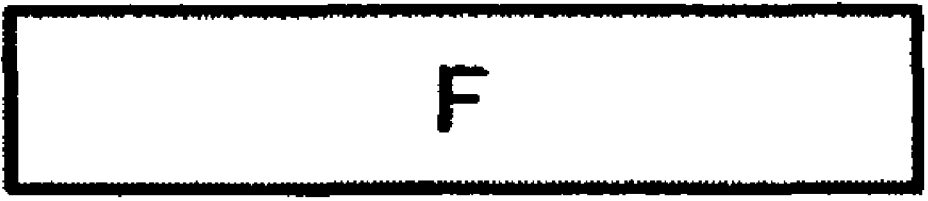
Figure 1:
Figure 1:

Further, FIG. 10 shows another pattern (a recorded magnetization pattern), which is a high-density single-cycle pattern including portions whose magnetization reversal interval is longer than that of the other portions. This pattern also allows the output polarity to be detected. Specifically, polarity detection regions with such a pattern written thereon are formed on the recording medium, and the magnetic disk drive detects the polarity of the output readback signal from the magnetic head when the magnetic head passes over the polarity detection regions. The configuration of the magnetic disk drive of the present embodiment is the same as that of the first embodiment shown in FIGS. 5 to 8. Further, the operation of the magnetic disk drive of the present embodiment is the same as that of the first embodiment shown in FIG. 1.

According to the above embodiments of the present invention, even if a reversal of the output polarity has occurred during operation of a magnetic disk drive, a magnetic disk drive can detect a reversal of the output polarity on a servo sector basis or on an output polarity detection pattern region basis, preventing seek and track following errors due to incorrect decoding of positional information attributed to such a reversal. Therefore, the magnetic disk drive can return to a normal write/read operation in a short time without performing special processing such as unloading the magnetic head from the disk. Furthermore, reversal of the output polarity is detected and corrected on a servo sector basis. This means that even if a reversal of the output polarity has occurred on a servo sector, the magnetic disk drive can still decode the readback signals from the subsequent servo sectors, which allows the drive to have increased reliability and prevent reduction of its data transfer speed.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:
1. A magnetic read/write device comprising:
 a magnetic recording medium with a plurality of tracks each having concentric servo sectors and data sectors thereon, said data sectors being disposed between said servo sectors;
 a magnetic head for reading information written in said tracks of said magnetic recording medium; and
 a signal processing circuit configured to receive a read output signal from said magnetic head and, upon detecting a reversal in a polarity of said magnetic head by processing said read output signal based on positional information in one of said servo sectors, performing the following steps:

interrupting positional control of said magnetic head so that no track seek or track following operation is performed for said servo sector, said positional control being performed based on said positional information;

generating a reversed polarity read output signal from said read output signal; and resuming said positional control of said magnetic head upon generating said reversed polarity read output signal.

2. The magnetic read/write device as claimed in claim 1, wherein said signal processing circuit detects said polarity of magnetic head on a servo sector basis.

3. The magnetic read/write device as claimed in claim 1, wherein said positional information comprises gray code.

4. The magnetic read/write device as claimed in claim 1, wherein said positional information comprises a cylinder number.

5. The magnetic read/write device as claimed in claim 1, wherein said positional information comprises a sector number.

6. A magnetic read/write device comprising:

a magnetic recording medium with a plurality of tracks each having concentric servo sectors and data sectors thereon, said data sectors being disposed between said servo sectors;

a magnetic head for reading information written in said tracks of said magnetic recording medium;

a signal processing circuit configured to receive a read output signal from said magnetic head and, upon detecting a reversal in a polarity of said magnetic head by processing said read output signal based on positional information one of said servo sectors, perform read error processing; and a polarity reversing unit configured, when said signal processing circuit has detected said reversal in said polarity of said magnetic head, to not perform any track seek or track following operation in said one of said servo sectors and generate a reversed polarity read output signal from said read output signal.

7. The magnetic read/write device as claimed in claim 6, wherein said polarity reversing unit is provided on the input side of said signal processing circuit.

8. The magnetic read/write device as claimed in claim 6, wherein said signal processing circuit detects said polarity of said magnetic head on a servo sector basis.

9. The magnetic read/write device as claimed in claim 6, wherein said positional information comprises gray code.

10. The magnetic read/write device as claimed in claim 6, wherein said positional information comprises a cylinder number.

11. The magnetic read/write device as claimed in claim 6, wherein said positional information comprises a sector number.

12. A magnetic read/write device comprising:

a magnetic recording medium with a plurality of tracks, a portion of each track having written thereon a concentric pattern for detecting a polarity of a magnetic head outputting a read output signal generated at least partially in response to said output polarity detection pattern;

said magnetic head for reading information written in said tracks of said magnetic recording medium; and a signal processing circuit configured to receive said read output signal from said magnetic head and, upon detecting a reversal in the said polarity of said magnetic head for a corresponding one of said track portions, performing the following steps:

interrupting positional control of said magnetic head so that no track seek or track following operation is performed said corresponding track portion, said positional control being performed based on positional information read from said tracks;

generating a reversed polarity read output signal from said read output signal; and resuming said positional control of said magnetic head upon generating said reversed polarity read output signal.

13. The magnetic read/write device as claimed in claim 12, wherein said pattern for detecting said polarity of said magnetic head has a single-polarity single-peaked waveform.

14. The magnetic read/write device as claimed in claim 12, wherein said positional information comprises gray code.

15. The magnetic read/write device as claimed in claim 12, wherein said positional information comprises a cylinder number.

16. The magnetic read/write device as claimed in claim 12, wherein said positional information comprises a sector number.

17. The magnetic read/write device as claimed in claim 12, furthering comprising a polarity reversing unit configured, when said signal processing circuit has detected a reversal in said polarity of said magnetic head, to generate said reversed polarity read output signal.

18. The magnetic read/write device as claimed in claim 17, wherein said polarity reversing unit is provided on the input side of said signal processing circuit.

* * * * *